United States Patent
Liang et al.

(10) Patent No.: US 10,442,312 B2
(45) Date of Patent: Oct. 15, 2019

(54) CHARGING UNMANNED AERIAL VEHICLE, FUNCTIONAL UNMANNED AERIAL VEHICLE AND AIR-CHARGING UNMANNED AERIAL VEHICLE SET THEREOF

(71) Applicant: Wistron Corp., New Taipei (TW)

(72) Inventors: Chen-Yi Liang, New Taipei (TW); Yung Chen Chang, New Taipei (TW); Shih-Yuan Chang, New Taipei (TW)

(73) Assignee: WISTRON CORP., New Taipei (TW)

( * ) Notice: Subject to any disclaimer, the term of this patent is extended or adjusted under 35 U.S.C. 154(b) by 96 days.

(21) Appl. No.: 15/828,279

(22) Filed: Nov. 30, 2017

(65) Prior Publication Data
US 2019/0084432 A1 Mar. 21, 2019

(30) Foreign Application Priority Data

Sep. 15, 2017 (TW) .............................. 106131735 A

(51) Int. Cl.
*B60L 53/80* (2019.01)
*B64C 39/02* (2006.01)
*B64D 35/02* (2006.01)

(52) U.S. Cl.
CPC ............ *B60L 53/80* (2019.02); *B64C 39/024* (2013.01); *B64D 35/02* (2013.01); *B64C 2201/042* (2013.01); *B64C 2201/06* (2013.01)

(58) Field of Classification Search
CPC ....... B60L 53/80; B64D 35/02; B64C 39/024; B64C 2201/06; B64C 2201/042; B64C 2201/066
See application file for complete search history.

(56) References Cited

U.S. PATENT DOCUMENTS

| | | | |
|---|---|---|---|
| 9,714,012 B1* | 7/2017 | Hoareau | B60S 5/06 |
| 10,017,265 B1* | 7/2018 | Larsen | B64D 27/24 |
| 10,029,803 B1* | 7/2018 | Larsen | B64D 39/00 |
| 2016/0031564 A1* | 2/2016 | Yates | B64D 33/00 307/9.1 |
| 2017/0247120 A1* | 8/2017 | Miller | B64F 1/36 |
| 2018/0093768 A1* | 4/2018 | Castleman | B64C 39/024 |
| 2018/0141453 A1* | 5/2018 | High | G05D 1/0684 |
| 2019/0047701 A1* | 2/2019 | Winkle | B64C 39/024 |

FOREIGN PATENT DOCUMENTS

| | | |
|---|---|---|
| CN | 205060016 U | 3/2016 |
| WO | WO 2018/142925 A1 * | 8/2018 |

* cited by examiner

Primary Examiner — Michael J Zanelli

(57) ABSTRACT

An air-charging unmanned aerial vehicle set is provided, including a charging unmanned aerial vehicle and a functional unmanned aerial vehicle. The charging unmanned aerial vehicle includes a first unmanned aerial vehicle body, a plurality of first propeller units, a rotation stage, a first battery slot and a second battery slot. The first propeller units are disposed on the first unmanned aerial vehicle body. The rotation stage is disposed on the first unmanned aerial vehicle body. The first battery slot and the second battery slot are disposed on the rotation stage. The functional unmanned aerial vehicle includes a second unmanned aerial vehicle body, a plurality of second propeller units, a third battery slot and a battery cover. The second propeller units, the third battery slot and the battery cover are disposed on the second unmanned aerial vehicle body.

16 Claims, 14 Drawing Sheets

CHARGING UNMANNED AERIAL VEHICLE, FUNCTIONAL UNMANNED AERIAL VEHICLE AND AIR-CHARGING UNMANNED AERIAL VEHICLE SET THEREOF

CROSS REFERENCE TO RELATED APPLICATIONS

This Application claims priority of Taiwan Patent Application No. 106131735, filed on Sep. 15, 2017, the entirety of which is incorporated by reference herein.

BACKGROUND OF THE INVENTION

Field of the Invention

The present invention relates to an air-charging unmanned aerial vehicle set, and in particular to an air-charging unmanned aerial vehicle set with a charging unmanned aerial vehicle and a functional unmanned aerial vehicle.

Description of the Related Art

Unmanned aerial vehicles (UAVs) are commonly utilized to perform tasks such as monitoring, detecting or transportation. The power shortage during the flight is an important problem with UAVs. When the electrical power that runs a UAV is exhausted during a monitoring or detecting task, the task must be interrupted, and this interruption may cause the task to end in failure. When the electrical power that runs a UAV is exhausted in the transportation of goods, the goods may drop and become damaged.

BRIEF SUMMARY OF THE INVENTION

In one embodiment, an air-charging unmanned aerial vehicle set is provided. The air-charging unmanned aerial vehicle set includes a charging unmanned aerial vehicle and a functional unmanned aerial vehicle. The charging unmanned aerial vehicle includes a first unmanned aerial vehicle body, a plurality of first propeller units, a rotation stage, a first battery slot, a second battery slot and a first connection rod. The first propeller units are disposed on the first unmanned aerial vehicle body. The rotation stage is disposed on the first unmanned aerial vehicle body, wherein the rotation stage is adapted to automatically rotate relative to the first unmanned aerial vehicle body. The first battery slot is disposed on the rotation stage. The second battery slot is disposed on the rotation stage. The first connection rod is disposed on the first unmanned aerial vehicle body, wherein the first connection rod is adapted to move between a first position and a second position. The functional unmanned aerial vehicle includes a second unmanned aerial vehicle body, a plurality of second propeller units, a third battery slot, a battery cover and a second connection rod. The second propeller units are disposed on the second unmanned aerial vehicle body. The third battery slot is disposed on the second unmanned aerial vehicle body. The battery cover is disposed on the second unmanned aerial vehicle body, wherein the battery cover moves automatically to cover the third battery slot. The second connection rod is disposed on the second unmanned aerial vehicle body, wherein the second connection rod is adapted to move between a third position and a fourth position. When the first connection rod is in the first position and the second connection rod is in the third position, the second connection rod connects to the first connection rod, and the functional unmanned aerial vehicle is connected to the charging unmanned aerial vehicle.

In one embodiment, the air-charging unmanned aerial vehicle set further comprises a rotation unit, wherein when the second connection rod is connected to the first connection rod, the second propeller units stop, and the rotation unit rotates the second unmanned aerial vehicle body so that the first unmanned aerial vehicle body and the second unmanned aerial vehicle body overlap.

In one embodiment, when the second unmanned aerial vehicle body overlaps the first unmanned aerial vehicle body, the second propeller units are staggered with the first propeller units.

In one embodiment, in a battery unloading state, the rotation stage is in a first orientation, the first battery slot corresponds to the third battery slot, and in a battery loading state, the rotation stage is in a second orientation, and the second battery slot corresponds to the third battery slot.

In one embodiment, the charging unmanned aerial vehicle further comprises a first robot arm and a second robot arm, and in the battery unloading state, the first robot arm picks a first battery from the third battery slot and receives the first battery into the first battery slot, and in the battery loading state, the second robot arm picks a second battery from the second battery slot and receives the second battery into the third battery slot.

In one embodiment, the first battery comprises a first conductive pad, the first conductive pad is disposed on a side surface of the first battery, the first robot arm comprises a plurality of first contacts, and when the first robot arm holds the first battery, the first conductive pad connects the first contacts together.

In one embodiment, the second battery comprises a second conductive pad, the second conductive pad is disposed on the bottom surface of the second battery, the third battery slot comprises a plurality of second contacts, and when the second battery is placed into the third battery slot, the second conductive pad connects the second contacts together.

In one embodiment, the charging unmanned aerial vehicle comprises a connection bracket, the functional unmanned aerial vehicle comprises an electromagnetic valve, a third conductive pad and a connection slot, the third conductive pad is disposed in the connection slot, the connection bracket comprises a plurality of third contacts, and when the connection bracket is inserted into the connection slot, the third conductive pad connects the third contacts together, and the electromagnetic valve accordingly connects the connection bracket.

In one embodiment, a charging unmanned aerial vehicle is provided. The charging unmanned aerial vehicle is adapted to be connected with a functional unmanned aerial vehicle. The charging unmanned aerial vehicle includes a first unmanned aerial vehicle body, a plurality of first propeller units, a rotation stage, a first battery slot and a second battery slot. The first propeller units are disposed on the first unmanned aerial vehicle body. The rotation stage is disposed on the first unmanned aerial vehicle body, wherein the rotation stage is adapted to automatically rotate relative to the first unmanned aerial vehicle body. The first battery slot is disposed on the rotation stage. The second battery slot is disposed on the rotation stage.

In one embodiment, the charging unmanned aerial vehicle further comprises a first connection rod, disposed on the first unmanned aerial vehicle body, wherein the first connection rod is adapted to move between a first position and a second position, and when the first connection rod is in the first position, the first connection rod connects to the functional unmanned aerial vehicle.

In one embodiment, the charging unmanned aerial vehicle further comprises a rotation unit, wherein when the first connection rod connects to the functional unmanned aerial vehicle, the rotation unit rotates the second unmanned aerial vehicle body of the functional unmanned aerial vehicle so that the first unmanned aerial vehicle body and the second unmanned aerial vehicle body overlap.

In one embodiment, a functional unmanned aerial vehicle is adapted to be connected with a charging unmanned aerial vehicle. The functional unmanned aerial vehicle includes a second unmanned aerial vehicle body, a plurality of second propeller units, a third battery slot and a battery cover. The second propeller units are disposed on the second unmanned aerial vehicle body. The third battery slot is disposed on the second unmanned aerial vehicle body. The battery cover is disposed on the second unmanned aerial vehicle body, wherein the battery cover moves automatically to cover the third battery slot.

In one embodiment, the functional unmanned aerial vehicle further comprises a second connection rod, disposed on the second unmanned aerial vehicle body, wherein the second connection rod is adapted to move between a third position and a fourth position, and when the second connection rod is in the third position, the second connection rod connects to the charging unmanned aerial vehicle.

Utilizing the air-charging unmanned aerial vehicle set, the battery inside the functional unmanned aerial vehicle is replaced by the charging unmanned aerial vehicle in the air. The endurance of the functional unmanned aerial vehicle is increased. The functional unmanned aerial vehicle therefore can work without being interrupted.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
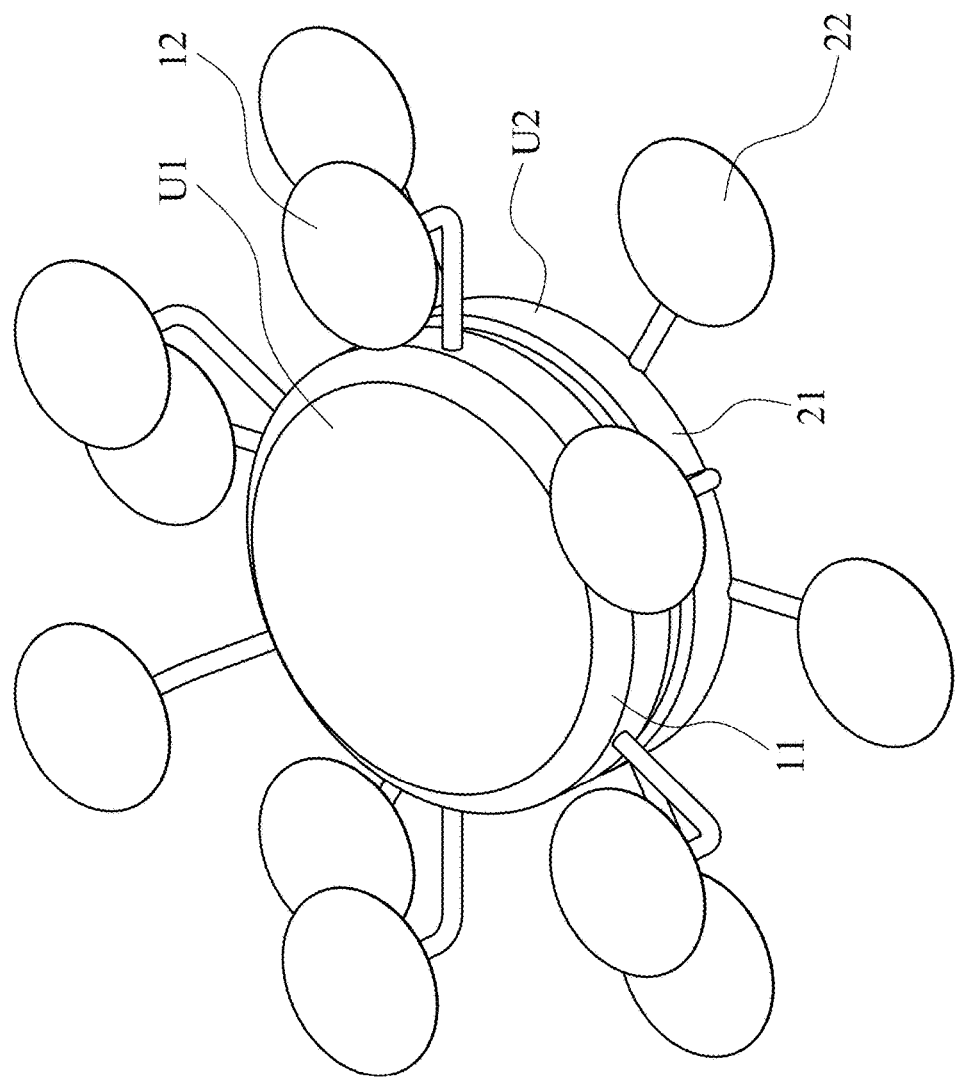
FIG. 1 shows an air-charging unmanned aerial vehicle set of an embodiment of the invention.
Figure 2A:
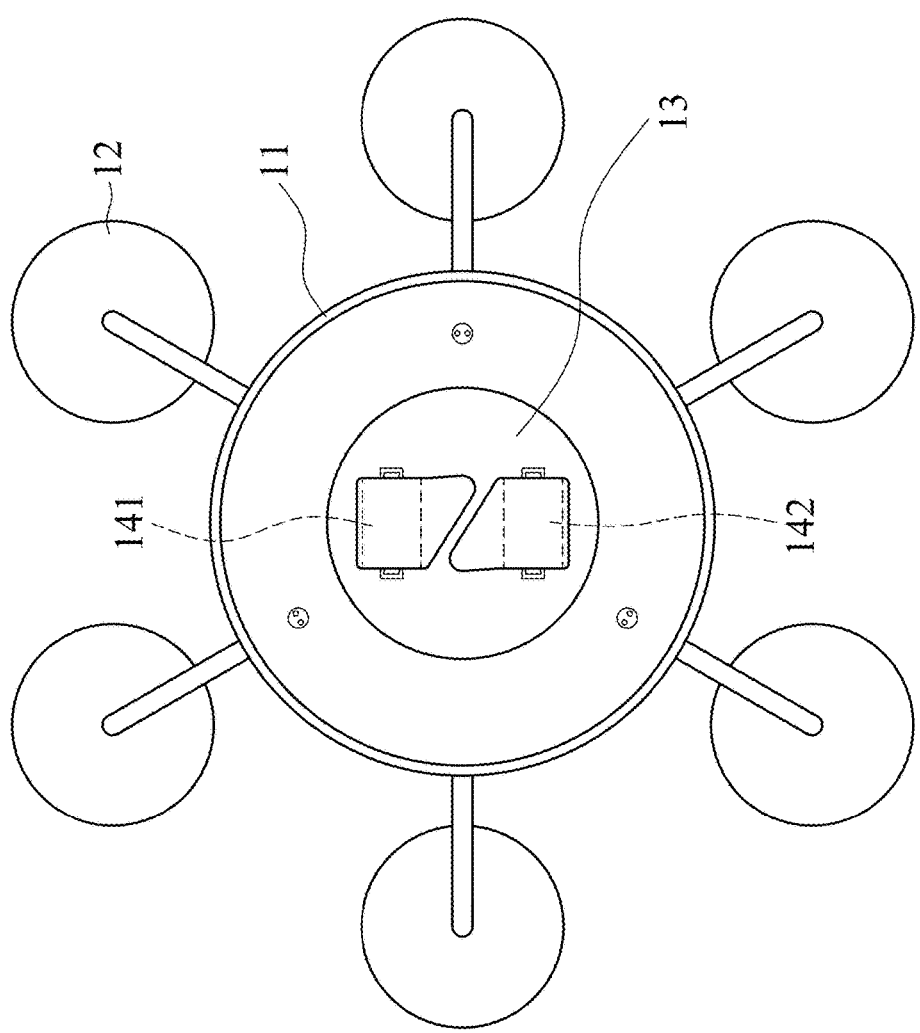
FIG. 2A shows the details of the charging unmanned aerial vehicle of the embodiment of the invention.

FIG. 1 shows an air-charging unmanned aerial vehicle set of an embodiment of the invention. With reference to FIG. 1, the air-charging unmanned aerial vehicle set U includes a charging unmanned aerial vehicle U1 and a functional unmanned aerial vehicle U2. FIG. 2A shows the details of the charging unmanned aerial vehicle U1. The charging unmanned aerial vehicle U1 includes a first unmanned aerial vehicle body 11, a plurality of first propeller units 12, a rotation stage 13, a first battery slot 141, a second battery slot 142 and a first connection rod 15 (not shown). The first propeller units 12 are disposed on the first unmanned aerial vehicle body 11. The rotation stage 13 is disposed on the first unmanned aerial vehicle body 11. The rotation stage 13 is adapted to automatically rotate relative to the first unmanned aerial vehicle body 11. The first battery slot 141 is disposed on the rotation stage 13. The second battery slot 142 is disposed on the rotation stage 13. The first connection rod 15 is disposed on the first unmanned aerial vehicle body 11. The first connection rod 15 is adapted to move between a first position and a second position.

Figure 2B:
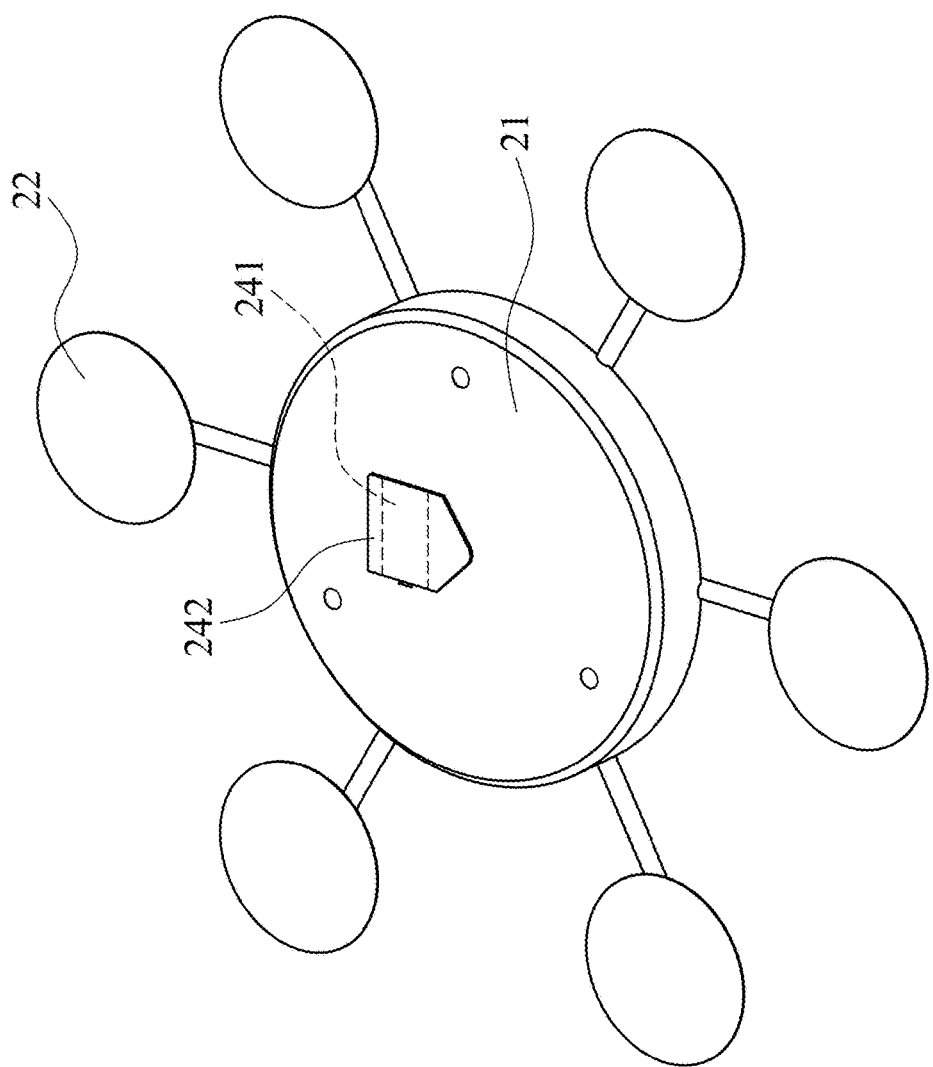
FIG. 2B shows the details of the functional unmanned aerial vehicle of the embodiment of the invention.

FIG. 2B shows the details of the functional unmanned aerial vehicle U2. With reference to FIG. 2B, the functional unmanned aerial vehicle U2 includes a second unmanned aerial vehicle body 21, a plurality of second propeller units 22, a third battery slot 241, a battery cover 242 and a second connection rod 25 (not shown). The second propeller units 22 are disposed on the second unmanned aerial vehicle body 21. The third battery slot 241 is disposed on the second unmanned aerial vehicle body 21. The battery cover 242 is disposed on the second unmanned aerial vehicle body 21, and the battery cover 242 moves automatically to cover the third battery slot 241. The second connection rod 25 (not shown) is disposed on the second unmanned aerial vehicle body 21. The second connection rod 25 (not shown) is adapted to move between a third position and a fourth position.

Figure 3A:
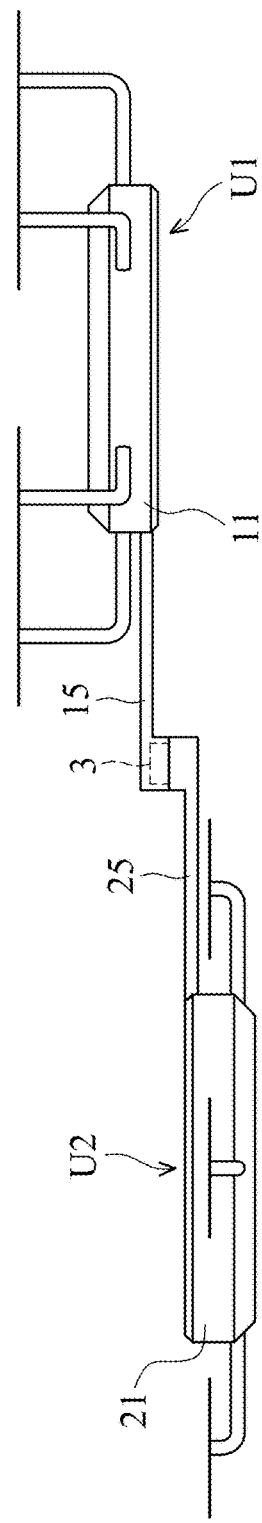
FIGS. 3A and 3B show the charging unmanned aerial vehicle connecting the functional unmanned aerial vehicle in the air of the embodiment of the invention.
Figure 3B:
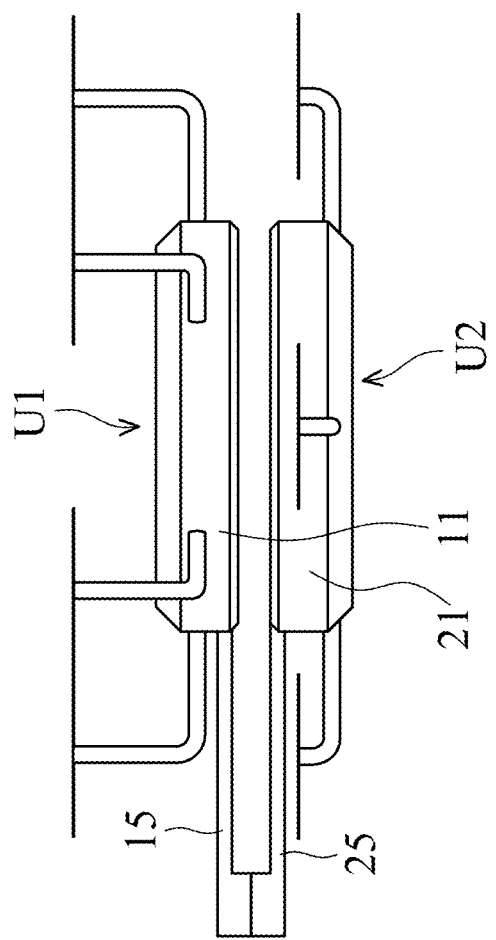

The connection process for connecting the charging unmanned aerial vehicle U1 and the functional unmanned aerial vehicle U2 is described as follows. With reference to FIGS. 3A and 3B, the charging unmanned aerial vehicle U1 needs to be connected to the functional unmanned aerial vehicle U2. The first connection rod 15 is in the first position and the second connection rod 25 is in the third position, the second connection rod 25 connects to the first connection rod 15, and the functional unmanned aerial vehicle U2 is therefore connected to the charging unmanned aerial vehicle U1. In one embodiment, the air-charging unmanned aerial vehicle set further comprises a rotation unit 3. In this embodiment, the rotation unit 3 is disposed on the first connection rod 15. However, the disclosure is not meant to restrict the invention. The rotation unit 3 can also be disposed on the second connection rod 25. When the second connection rod 25 is connected to the first connection rod 15, the second propeller units 22 stop, and the speed of the first propeller units 12 is increased. Then, as shown in FIG. 3B, the rotation unit 3 rotates the second unmanned aerial vehicle body 21 so that the first unmanned aerial vehicle body 11 and the second unmanned aerial vehicle body 21 overlap.

Utilizing the first connection rod 15 and the second connection rod 25, the charging unmanned aerial vehicle U1 and the functional unmanned aerial vehicle U2 can be connected in the air, and the airflow interference generated in the connection process is reduced. With reference to FIG. 1, in one embodiment, when the second unmanned aerial vehicle body 21 overlaps the first unmanned aerial vehicle body 11, the second propeller units 22 are staggered with the first propeller units 12. In other words, the second propeller units 22 are prevented from overlapping with the first propeller units 12. The performance of the first propeller units 12 is therefore prevented from being influenced by the second propeller units 22.

Figure 4A:
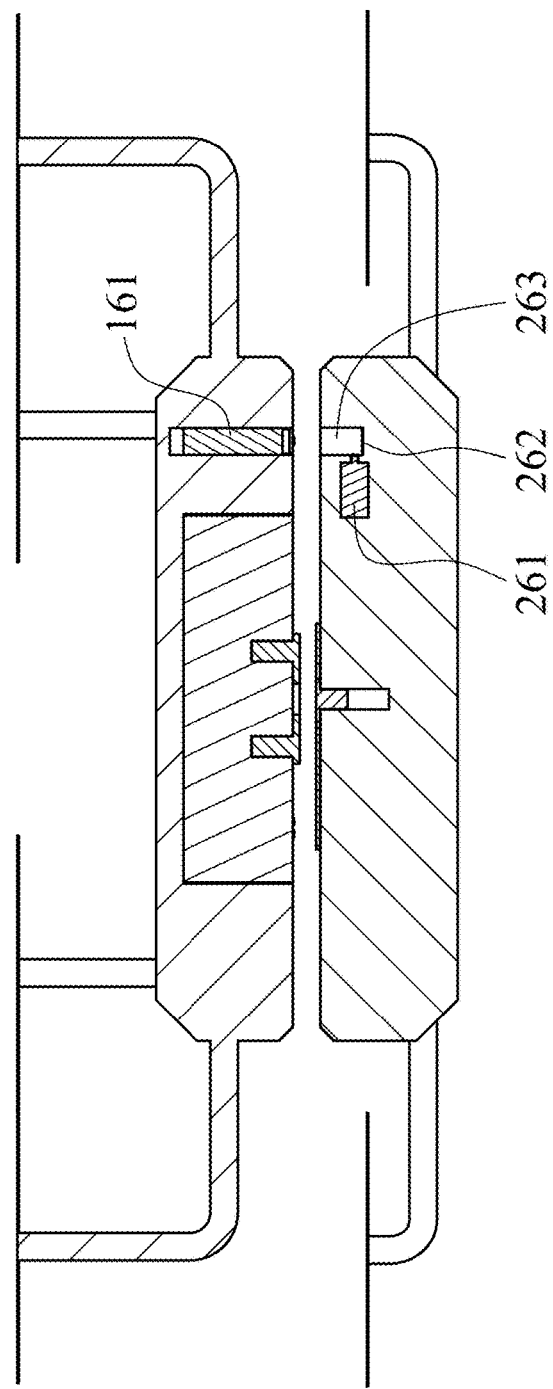
FIGS. 4A, 4B and 4C show the charging unmanned aerial vehicle firmly connecting the functional unmanned aerial vehicle of the embodiment of the invention.
Figure 4C:
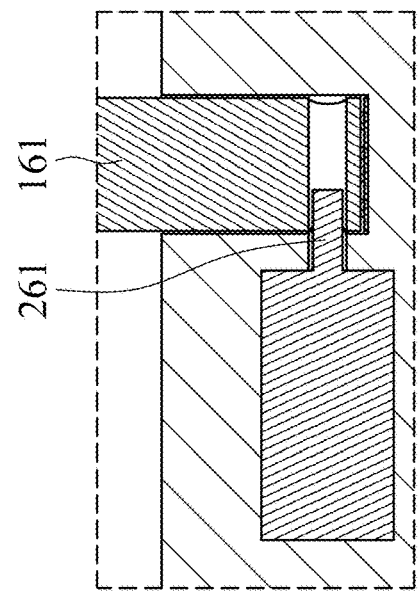
Figure 4B:
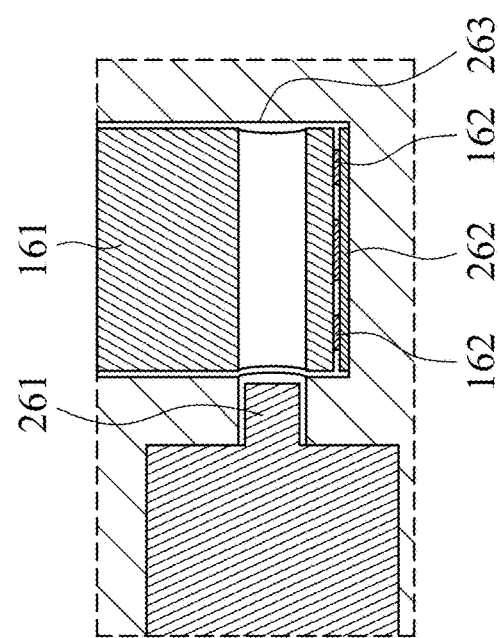

After the second unmanned aerial vehicle body 21 overlaps the first unmanned aerial vehicle body 11, the second unmanned aerial vehicle body 21 is firmly connected to the first unmanned aerial vehicle body 11. With reference to FIGS. 4A, 4B and 4C, in one embodiment, the charging unmanned aerial vehicle U1 comprises a connection bracket 161. The functional unmanned aerial vehicle U2 comprises an electromagnetic valve 261, a third conductive pad 262 and a connection slot 263. The third conductive pad 262 is disposed in the connection slot 263. The connection bracket 161 comprises a plurality of third contacts 162. First, the connection bracket 161 is inserted into the connection slot 263 (FIG. 4A). Then, the third contacts 162 contact the third conductive pad 262, and the third contacts 162 are conducted with each other (FIG. 4B). Next, the electromagnetic valve 261 connects the connection bracket 161 (by wedging, for example) according to the feedback signal transmitted from the third contacts 162 (FIG. 4C). Utilizing the connection bracket 161, the electromagnetic valve 261 and a connection slot 263, the second unmanned aerial vehicle body 21 is further firmly connected to the first unmanned aerial vehicle body 11.

Figure 5A:
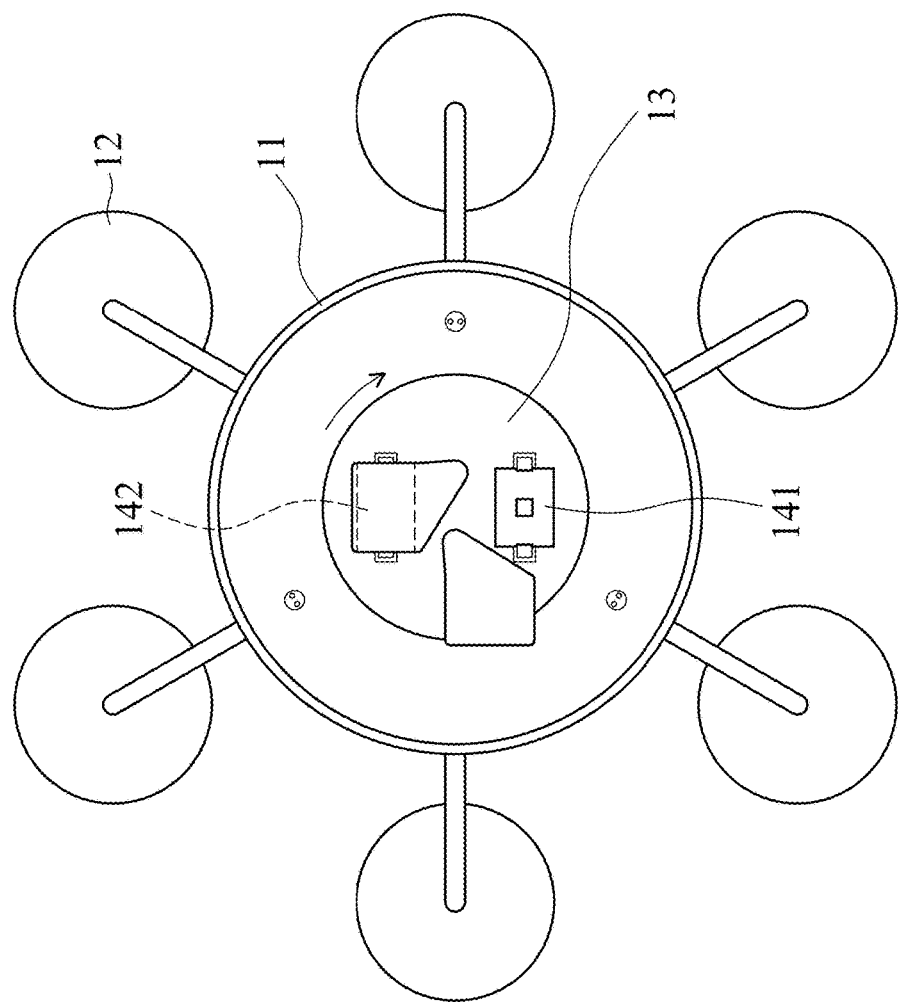
FIGS. 5A and 5B show the batteries being replaced between the charging unmanned aerial vehicle and the functional unmanned aerial vehicle of the embodiment of the invention.
Figure 5B:
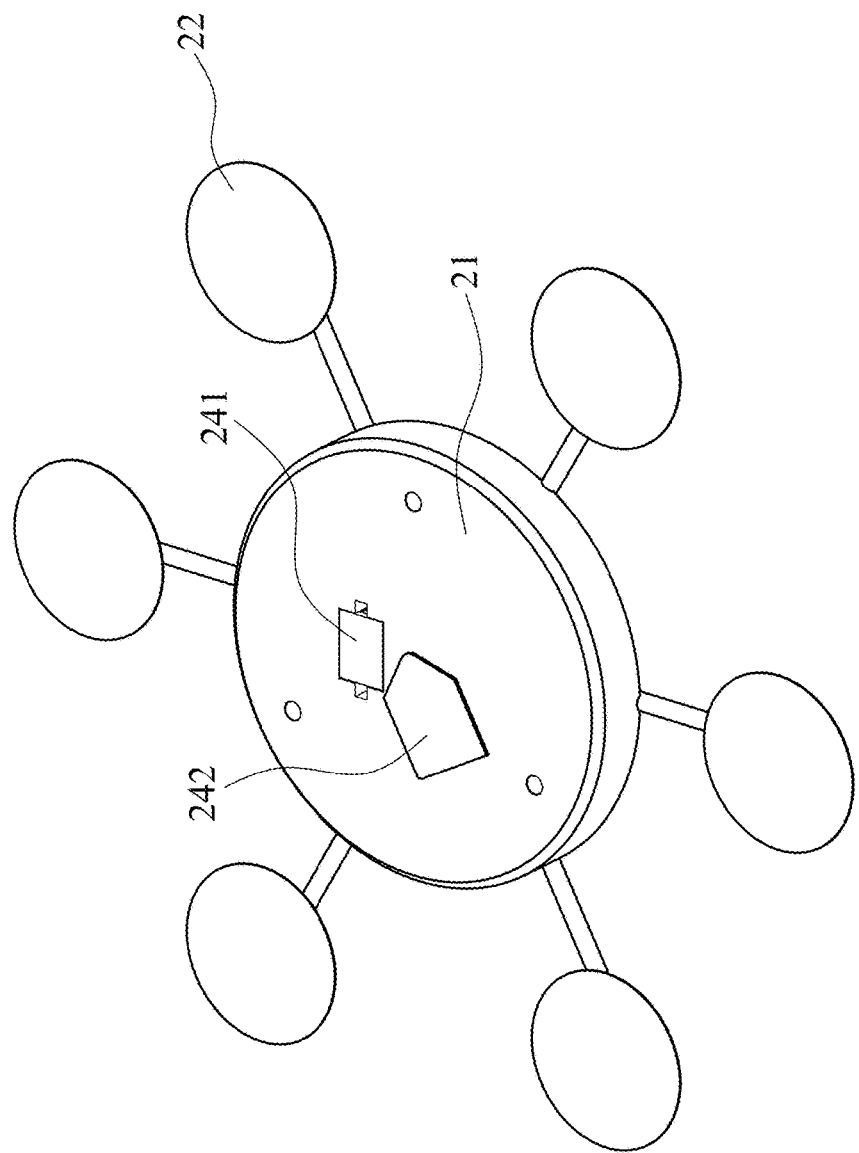
Figure 6D:
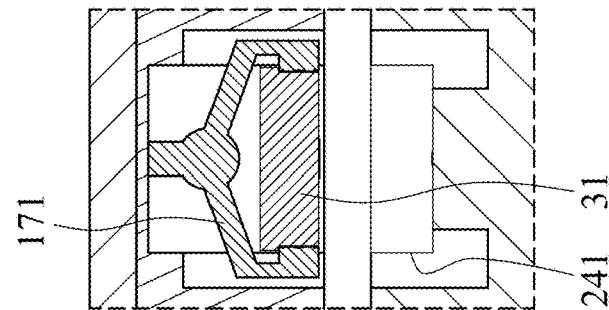
FIGS. 6A, 6B, 6C and 6D show the robot arms of the embodiment of the invention picking and placing the batteries.
Figure 6C:
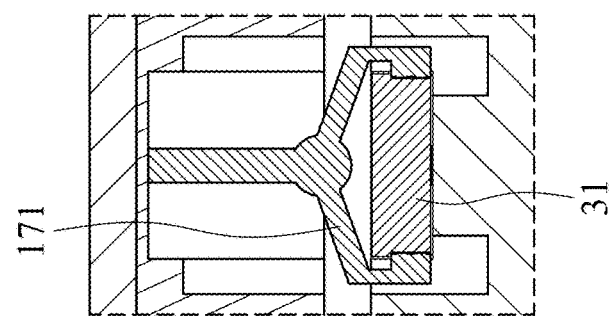
Figure 6B:
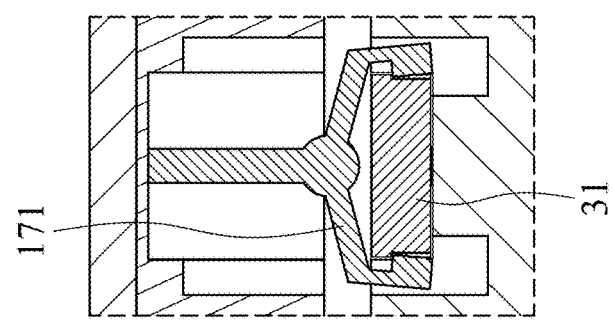
Figure 6A:
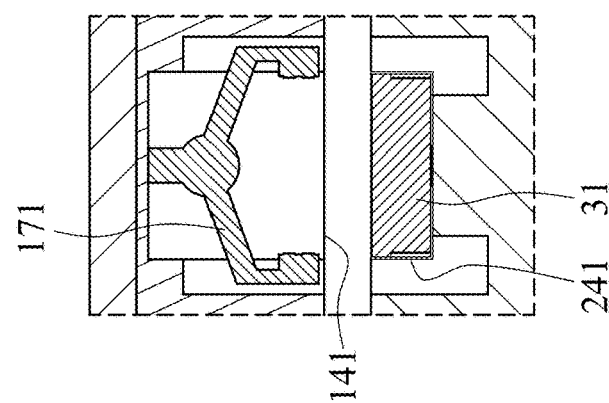

The battery replacement process between the charging unmanned aerial vehicle U1 and the functional unmanned aerial vehicle U2 is described as follows. With reference to FIGS. 5A and 5B, the rotation stage 13 can be rotated automatically. In this embodiment, the first battery slot 141 and the second battery slot 142 are covered by battery covers which are automatically rotatable. However, the disclosure is not meant to restrict the invention. In another embodiment, the battery covers upon the first battery slot 141 and the second battery slot 142 can also be omitted. In a battery unloading state, the rotation stage 13 is in a first orientation, and the first battery slot 141 corresponds to the third battery slot 241. Therefore, a first battery inside the third battery slot 241 (the power-exhausted battery) can be moved to the first battery slot 141. In a battery loading state, the rotation stage is in a second orientation, and the second battery slot 142 corresponds to the third battery slot 241. Therefore, a second battery inside the second battery slot 142 (the full-power battery) can be moved to the third battery slot 241.

In one embodiment, the charging unmanned aerial vehicle U1 further comprises a first robot arm and a second robot arm. In the battery unloading state, the first robot arm picks the first battery from the third battery slot 241 and receives the first battery into the first battery slot. In the battery loading state, the second robot arm picks the second battery from the second battery slot 142 and receives the second battery into the third battery slot 241. The battery inside the functional unmanned aerial vehicle U2 is therefore replaced. With reference to FIGS. 6A to 6D, to clarify the description, only the battery unloading state is presented. The first robot arm 171 picks the first battery 31 from the third battery slot 241 and receives the first battery into the first battery slot 141. The description of the movement in the battery loading state is omitted.

Figure 7A:
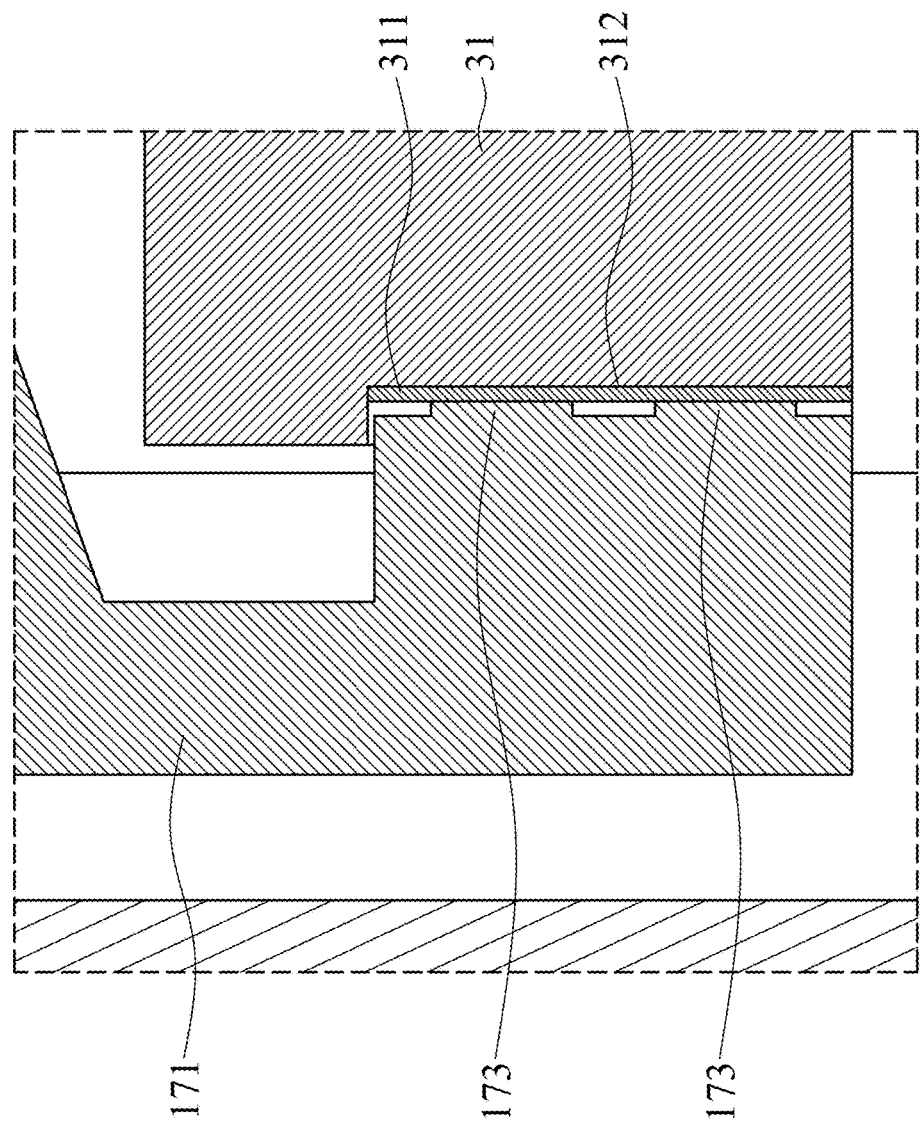
FIG. 7A shows the battery of the embodiment of the invention being picked up.

With reference to FIG. 7A, in one embodiment, the first battery 31 comprises a first conductive pad 311. The first conductive pad 311 is disposed on a side surface 312 of the first battery 31. The first robot arm 171 comprises a plurality of first contacts 173. When the first robot arm 171 holds the first battery 31, the first conductive pad 311 connects the first contacts together 173, and the first contacts 173 are conducted with each other. A control circuit of the charging unmanned aerial vehicle U1 confirms that the first battery 31 is held by the first robot arm 171.

Figure 7B:
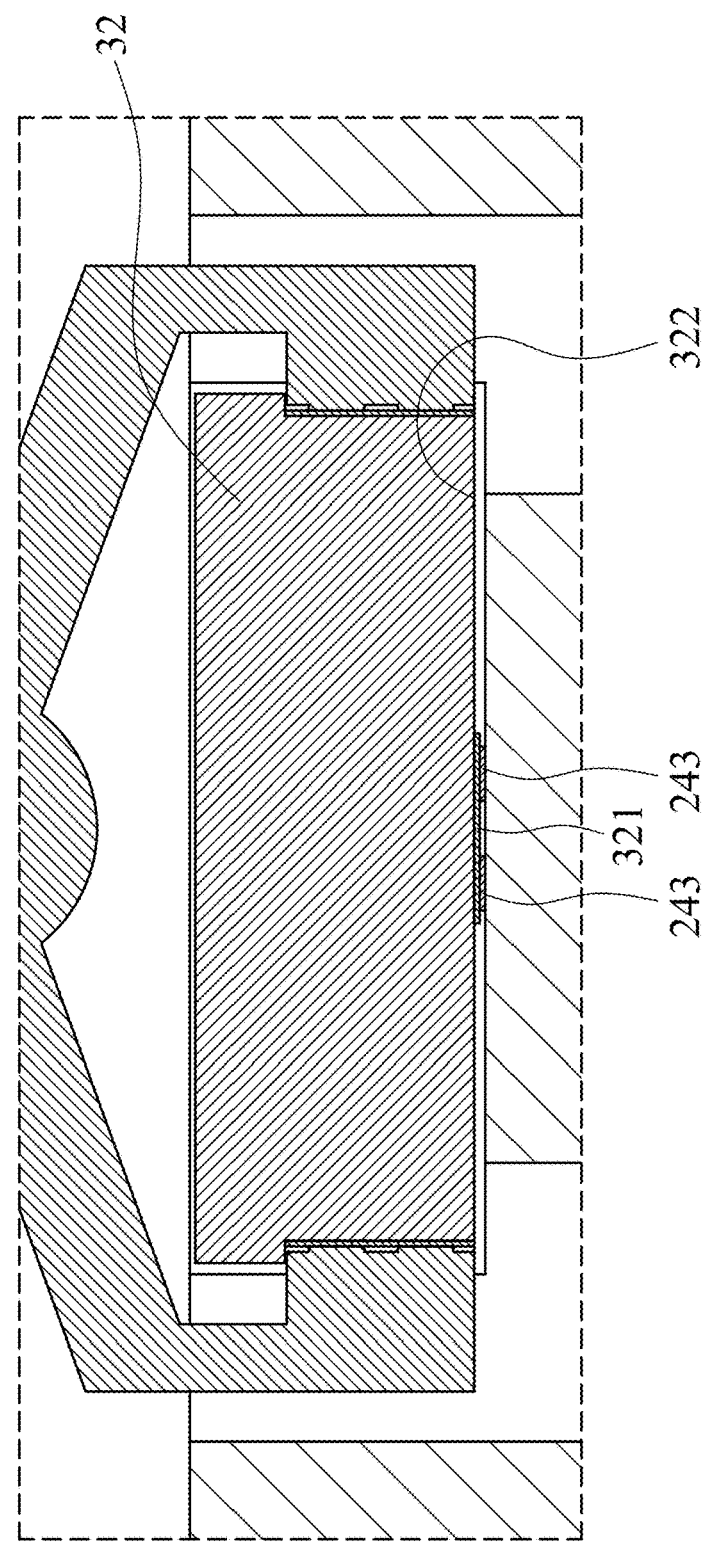
FIG. 7B shows the battery of the embodiment of the invention being placed.

With reference to FIG. 7B, in one embodiment, the second battery 32 comprises a second conductive pad 321. The second conductive pad 321 is disposed on a bottom surface 322 of the second battery 32. The third battery slot 241 comprises a plurality of second contacts 243. When the second battery 32 is placed into the third battery slot 241, the second conductive pad 321 connects the second contacts 243 together, and the second contacts 243 are conducted with each other. A control circuit of the functional unmanned aerial vehicle U2 confirms that the second battery 32 is placed into the third battery slot 241.

Figure 8A:
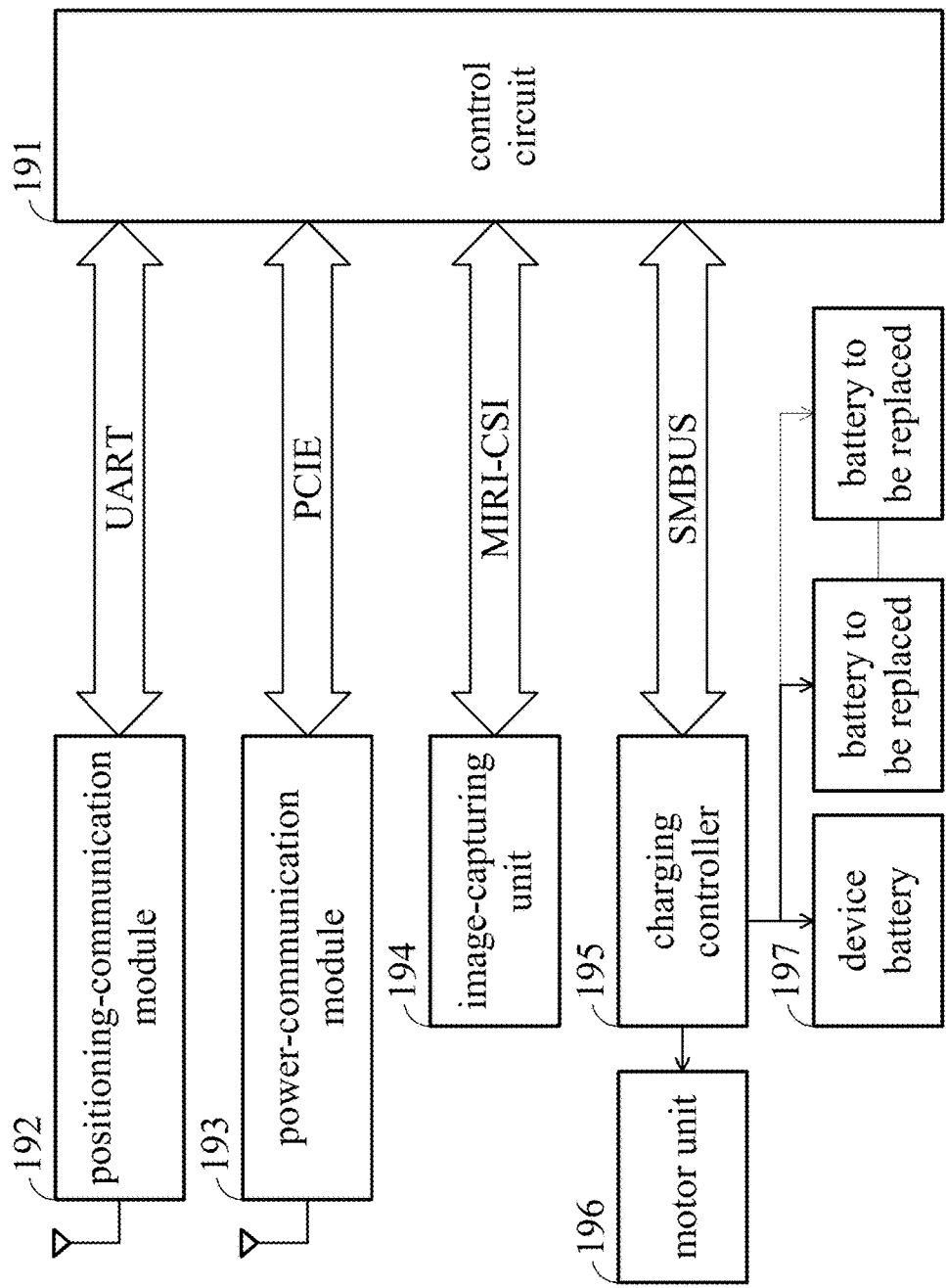
FIG. 8A is a block diagram of the charging unmanned aerial vehicle of the embodiment of the invention.

FIG. 8A is a block diagram of the charging unmanned aerial vehicle U1 of the embodiment of the invention. The charging unmanned aerial vehicle U1 includes a control circuit 191, a positioning-communication module 192, a power-communication module 193, an image-capturing unit 194, a charging controller 195, a motor unit 196, a device battery 197 and the battery that needs to be replaced (i.e. the second battery 32). The positioning-communication module 192, the power-communication module 193, the image-capturing unit 194 and the charging controller 195 are coupled to the control circuit 191. The control circuit 191 comprises a CPU. The image-capturing unit 194 confirms the relative positions of the charging unmanned aerial vehicle U1 and the functional unmanned aerial vehicle U2. The charging controller 195 is coupled to the motor unit 196, the device battery 197 and the battery that needs to be replaced (i.e. the second battery 32). The motor unit 196 comprises a plurality of motors for driving the rotation stage, the rotation unit and the robot arms. The feedback signal provided by the first contacts is transmitted to the control circuit 191 via the charging controller 195.

Figure 8B:
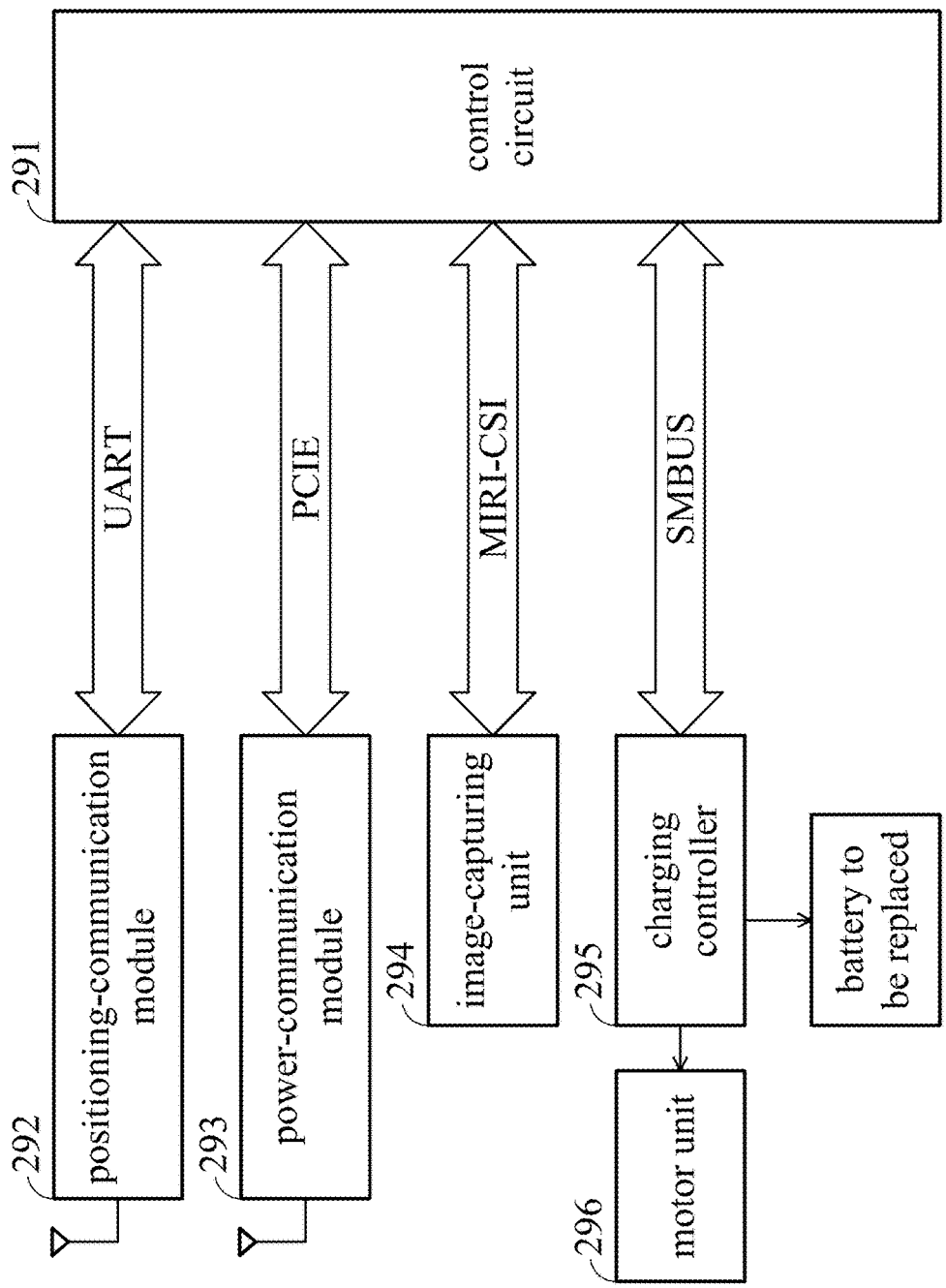
FIG. 8B is a block diagram of the functional unmanned aerial vehicle of the embodiment of the invention.

FIG. 8B is a block diagram of the functional unmanned aerial vehicle U2 of the embodiment of the invention. The functional unmanned aerial vehicle U2 includes a control circuit 291, a positioning-communication module 292, a power-communication module 293, an image-capturing unit 294, a charging controller 295, a motor unit 296 and the battery that needs to be replaced (i.e. the first battery 31). The positioning-communication module 292, the power-communication module 293, the image-capturing unit 294 and the charging controller 295 are coupled to the control circuit 291. The control circuit 291 comprises a CPU. The image-capturing unit 294 confirms the relative positions of the charging unmanned aerial vehicle U1 and the functional unmanned aerial vehicle U2. The charging controller 295 is coupled to the motor unit 296 and the battery that needs to be replaced (i.e. the first battery 31). The motor unit 296 comprises a plurality of motors for driving the elements such as the battery cover. The feedback signal provided by the second contacts is transmitted to the control circuit 291 via the charging controller 295.

Utilizing the air-charging unmanned aerial vehicle set, the battery inside the functional unmanned aerial vehicle U2 is replaced by the charging unmanned aerial vehicle U1 in the air. The endurance of the functional unmanned aerial vehicle U2 is increased. The functional unmanned aerial vehicle U2 therefore can work without being interrupted.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An air-charging unmanned aerial vehicle set, comprising:
   a charging unmanned aerial vehicle, comprising:
   a first unmanned aerial vehicle body;
   a plurality of first propeller units, disposed on the first unmanned aerial vehicle body;
   a rotation stage, disposed on the first unmanned aerial vehicle body, wherein the rotation stage automatically rotates relative to the first unmanned aerial vehicle body;
   a first battery slot, disposed on the rotation stage;
   a second battery slot, disposed on the rotation stage; and
   a first connection rod, disposed on the first unmanned aerial vehicle body, wherein the first connection rod is adapted to move between a first position and a second position; and
   a functional unmanned aerial vehicle, comprising:
   a second unmanned aerial vehicle body;
   a plurality of second propeller units, disposed on the second unmanned aerial vehicle body;
   a third battery slot, disposed on the second unmanned aerial vehicle body;
   a battery cover, disposed on the second unmanned aerial vehicle body, wherein the battery cover moves automatically to cover the third battery slot; and
   a second connection rod, disposed on the second unmanned aerial vehicle body, wherein the second connection rod is adapted to move between a third position and a fourth position,
   wherein when the first connection rod is in the first position and the second connection rod is in the third position, the second connection rod connects to the first connection rod, and the functional unmanned aerial vehicle is connected to the charging unmanned aerial vehicle.

2. The air-charging unmanned aerial vehicle set as claimed in claim 1, further comprising a rotation unit, wherein when the second connection rod is connected to the first connection rod, the second propeller units stop, and the rotation unit rotates the second unmanned aerial vehicle body so that the first unmanned aerial vehicle body and the second unmanned aerial vehicle body overlap.

3. The air-charging unmanned aerial vehicle set as claimed in claim 2, wherein when the second unmanned aerial vehicle body overlaps the first unmanned aerial vehicle body, the second propeller units are staggered with the first propeller units.

4. The air-charging unmanned aerial vehicle set as claimed in claim 3, wherein in a battery unloading state, the rotation stage is in a first orientation, the first battery slot corresponds to the third battery slot, and in a battery loading state, the rotation stage is in a second orientation, and the second battery slot corresponds to the third battery slot.

5. The air-charging unmanned aerial vehicle set as claimed in claim 4, wherein the charging unmanned aerial vehicle further comprises a first robot arm and a second robot arm, and in the battery unloading state, the first robot arm picks a first battery from the third battery slot and receives the first battery into the first battery slot, and in the battery loading state, the second robot arm picks a second battery from the second battery slot and receives the second battery into the third battery slot.

6. The air-charging unmanned aerial vehicle set as claimed in claim 5, wherein the first battery comprises a first conductive pad, the first conductive pad is disposed on a side surface of the first battery, the first robot arm comprises a plurality of first contacts, and when the first robot arm holds the first battery, the first conductive pad connects the first contacts together.

7. The air-charging unmanned aerial vehicle set as claimed in claim 5, wherein the second battery comprises a second conductive pad, the second conductive pad is disposed on a bottom surface of the second battery, the third battery slot comprises a plurality of second contacts, and when the second battery is placed into the third battery slot, the second conductive pad connects the second contacts together.

8. The air-charging unmanned aerial vehicle set as claimed in claim 1, wherein the charging unmanned aerial vehicle comprises a connection bracket, the functional unmanned aerial vehicle comprises an electromagnetic valve, a third conductive pad and a connection slot, the third conductive pad is disposed in the connection slot, the connection bracket comprises a plurality of third contacts, and when the connection bracket is inserted into the connection slot, the third conductive pad connects the third contacts together, and the electromagnetic valve accordingly connects the connection bracket.

9. A charging unmanned aerial vehicle, adapted to be connected with a functional unmanned aerial vehicle, comprising:
   a first unmanned aerial vehicle body;
   a plurality of first propeller units, disposed on the first unmanned aerial vehicle body;
   a rotation stage, disposed on the first unmanned aerial vehicle body, wherein the rotation stage is adapted to automatically rotate relative to the first unmanned aerial vehicle body;
   a first battery slot, disposed on the rotation stage;
   a second battery slot, disposed on the rotation stage; and
   a first connection rod, disposed on the first unmanned aerial vehicle body, wherein the first connection rod is adapted to move between a first position and a second position, and when the first connection rod is in the first position, the first connection rod connects to the functional unmanned aerial vehicle.

10. The charging unmanned aerial vehicle as claimed in claim 9, further comprising a rotation unit, wherein when the first connection rod connects to the functional unmanned aerial vehicle, the rotation unit rotates a second unmanned aerial vehicle body of the functional unmanned aerial vehicle so that the first unmanned aerial vehicle body and the second unmanned aerial vehicle body overlap.

11. The charging unmanned aerial vehicle as claimed in claim 9, wherein in a battery unloading state, the rotation stage is in a first orientation, the first battery slot corresponds to a third battery slot of the functional unmanned aerial vehicle, and in a battery loading state, the rotation stage is in a second orientation, and the second battery slot corresponds to the third battery slot.

12. The charging unmanned aerial vehicle as claimed in claim 11, wherein the charging unmanned aerial vehicle further comprises a first robot arm and a second robot arm, and in the battery unloading state, the first robot arm picks a first battery from the third battery slot and receives the first battery into the first battery slot, and in the battery loading state, the second robot arm picks a second battery from the second battery slot and receives the second battery into the third battery slot.

13. The charging unmanned aerial vehicle as claimed in claim 12, wherein the first battery comprises a first conductive pad, the first conductive pad is disposed on a side surface of the first battery, the first robot arm comprises a plurality of first contacts, and when the first robot arm holds the first battery, the first conductive pad connects the first contacts together.

14. The charging unmanned aerial vehicle as claimed in claim 13, wherein the second battery comprises a second conductive pad, the second conductive pad is disposed on the bottom surface of the second battery, the third battery slot comprises a plurality of second contacts, and when the second battery is placed into the third battery slot, the second conductive pad connects the second contacts together.

15. The charging unmanned aerial vehicle as claimed in claim 9, wherein the charging unmanned aerial vehicle comprises a connection bracket, the functional unmanned aerial vehicle comprises an electromagnetic valve, a third conductive pad and a connection slot, the third conductive pad is disposed in the connection slot, the connection bracket comprises a plurality of third contacts, and when the connection bracket is inserted into the connection slot, the third conductive pad connects the third contacts together, and the electromagnetic valve accordingly connects the connection bracket.

16. A functional unmanned aerial vehicle, adapted to be connected with a charging unmanned aerial vehicle, comprising:

a second unmanned aerial vehicle body;

a plurality of second propeller units, disposed on the second unmanned aerial vehicle body;

a third battery slot, disposed on the second unmanned aerial vehicle body;

a battery cover, disposed on the second unmanned aerial vehicle body, wherein the battery cover moves automatically to cover the third battery slot; and a second connection rod, disposed on the second unmanned aerial vehicle body, wherein the second connection rod is adapted to move between a third position and a fourth position, and when the second connection rod is in the third position, the second connection rod connects to the charging unmanned aerial vehicle.

* * * * *